United States Patent
Sweeney et al.

(10) Patent No.: US 10,498,402 B2
(45) Date of Patent: Dec. 3, 2019

(54) INDUCTOR, A RELATED METHOD OF MANUFACTURE, A TRANSMITTER INCLUDING SAID INDUCTOR, AND A RELATED PROXIMITY DETECTION SYSTEM

(71) Applicant: MINE SITE TECHNOLOGIES PTY LTD, North Ryde (AU)

(72) Inventors: Peter John Sweeney, North Ryde (AU); Martin Christopher Wildt, North Ryde (AU)

(73) Assignee: MINE SITE TECHNOLOGIES PTY LT (AU)

( * ) Notice: Subject to any disclaimer, the term of this patent is extended or adjusted under 35 U.S.C. 154(b) by 0 days.

(21) Appl. No.: 15/126,065

(22) PCT Filed: Mar. 24, 2015

(86) PCT No.: PCT/AU2015/050131
§ 371 (c)(1),
(2) Date: Sep. 14, 2016

(87) PCT Pub. No.: WO2015/143505
PCT Pub. Date: Oct. 1, 2015

(65) Prior Publication Data
US 2017/0099086 A1    Apr. 6, 2017

(30) Foreign Application Priority Data
Mar. 24, 2014   (AU) ................................ 2014901045

(51) Int. Cl.
*H04B 5/00* (2006.01)
*H01F 21/08* (2006.01)
(Continued)

(52) U.S. Cl.
CPC ............. *H04B 5/0075* (2013.01); *H01F 3/10* (2013.01); *H01F 21/08* (2013.01); *H01F 27/2823* (2013.01); *H01F 41/06* (2013.01)

(58) Field of Classification Search
CPC ... H04B 5/0075; H01F 27/2823; H01F 41/06; H01F 3/10; H01F 21/08
(Continued)

(56) References Cited

U.S. PATENT DOCUMENTS 5,345,222 A    9/1994   Davies et al.
7,973,628 B1   7/2011   MacLennan
(Continued)

FOREIGN PATENT DOCUMENTS

WO    WO 2009/120671    10/2009

OTHER PUBLICATIONS

International Search Report and Written Opinion prepared by the Australian Patent Office dated Apr. 16, 2015, for International Application No. PCT/AU2015/050131.
(Continued)

*Primary Examiner* — Eugene Yun
(74) *Attorney, Agent, or Firm* — Sheridan Ross P.C.

(57) ABSTRACT

The invention relates to an inductor, and particularly to an inductor for a transmitter circuit. The invention also concerns a transmitter including said inductor, a proximity detection system employing such a transmitter, and a method of making said inductor. The inductor of the invention includes a core having non-uniform permeability and a conductor winding arranged around the core. When used in a transmitter circuit, this allows an induced electromagnetic field to propagate through the core in a more efficient manner than otherwise possible, so resulting in a higher dynamic field strength for a given resonant circuit drive.

19 Claims, 5 Drawing Sheets

(51) Int. Cl.
   *H01F 3/10*     (2006.01)
   *H01F 27/28*    (2006.01)
   *H01F 41/06*    (2016.01)

(58) Field of Classification Search
   USPC ........................................................ 455/41.1
   See application file for complete search history.

(56) References Cited

U.S. PATENT DOCUMENTS 8,232,888 B2     7/2012  Frederick et al.
   8,446,277 B2     5/2013  Frederick
   2004/0263305 A1*  12/2004  Oughton, Jr. ......... H01F 27/085
                                                    336/55
   2010/0305402 A1*  12/2010  Shachar ............ A61B 1/00158
                                                    600/118
   2014/0132380 A1*  5/2014   Jacobson ............ H01F 27/025
                                                    336/60

OTHER PUBLICATIONS

International Preliminary Report on Patentability prepared by the Australian Patent Office dated Dec. 17, 2015, for International Application No. PCT/AU2015/050131.

* cited by examiner

DETAIL A

INDUCTOR, A RELATED METHOD OF MANUFACTURE, A TRANSMITTER INCLUDING SAID INDUCTOR, AND A RELATED PROXIMITY DETECTION SYSTEM

CROSS REFERENCE TO RELATED APPLICATIONS

This application is a national stage application under 35 U.S.C. 371 and claims the benefit of PCT Application No. PCT/AU2015/050131 having an international filing date of 24 Mar. 2015, which designated the United States, which PCT application claimed the benefit of Australian Patent Application No. 2014901045 filed 24 Mar. 2014, the disclosure of each of which are incorporated herein by reference.

FIELD OF THE INVENTION

The invention relates to an inductor. More particularly, the invention relates to an inductor for a transmitter circuit. The invention also concerns a transmitter including said inductor, a proximity detection system employing such a transmitter, and a method of making said inductor.

BACKGROUND OF THE INVENTION

Many work sites, such as engineering work sites and materials handling sites that involve the operation and movement of vehicles, equipment and machinery (for example, trucks, cranes, tractors, forklifts, conveyors, dump vehicles, diggers, crushers, underground mining equipment and the like) often require special measures to minimise risk of injury and other damage, and to meet particular safety requirements.

The prior art includes warning systems such as proximity detection and collision avoidance systems that have been developed to assist workers or equipment operators to detect the proximity of another worker or machinery so as to avoid collision. However, many work sites are located in harsh environments which may afford poor visibility, noisy or poor sound transmission, and/or be prone to radio signal interference. For these and various other reasons, many existing proximity detection systems have been of limited effectiveness in some work places. In some cases, the signals generated by these proximity detection systems can be weak or otherwise difficult to detect, prone to interruption, and/or prone to interference.

The present invention aims to address at least in part one or more of the disadvantages or problems described above, or at least to provide the relevant industries with a useful choice.

In this specification, where a document, act or item of knowledge is referred to or discussed, this reference or discussion is not an admission that the document, act or item of knowledge or any combination thereof was at the priority date:
1. part of common general knowledge; or
2. known to be relevant to an attempt to solve any problem with which this specification is concerned.

SUMMARY OF THE INVENTION

According to one aspect of the invention, there is provided an inductor including a core having non-uniform permeability, and a conductor winding arranged around the core.

In a preferred form, the core has reduced permeability in an outer region of the core.

Preferably, the core is an elongate core with an axial centreline, the core having a first region around said centreline, and an outer region surrounding said first region, the core having high permeability in said first region and lower permeability in the surrounding outer region.

Said first region may be a central region which includes said axial centreline, or may be a region surrounding said axial centreline. In this form, the core has high permeability in its central region and lower permeability in the surrounding outer region.

Alternatively, the core may have high permeability in an intermediate region surrounding the central region and lower permeability in the outer region surrounding the intermediate region, so providing the reduced permeability in the outer region of the core.

By providing a non-uniform core permeability, core losses due to eddy currents and hysteresis can be effectively reduced. In particular, by having a core with reduced permeability in an outer region, the region of reduced permeability is positioned close to the conductor windings and thus to the applied alternating electric field. This arrangement advantageously allows an induced electromagnetic field to propagate through the core in a more efficient manner than otherwise possible. When used in electromagnetic field generation, this results in a higher dynamic field strength for a given resonant circuit drive.

Preferably, the core is a ferrite core, such as a ferromagnetic ceramic powdered alloy core.

Preferably, the conductor winding is closely wound around and carried by the core. The conductor winding may be separated from the core by only a thin layer of insulation.

Typically, the inductor is used in low frequency applications involving an operating frequency of approximately 30 kHz to 300 kHz. In particular, the inductor may be used in low frequency applications having an operating frequency of approximately 125 kHz.

The elongated ferrite core may be of any suitable shape or size. Preferably, the core is substantially cylindrical, but may take any other suitable form, with a regular or an irregular section.

In a preferred form, the outer regions of the ferrite core include a plurality of voids. The voids may be any suitable shape or size. For example, the voids may be elongate voids with a cylindrical, rectangular, triangular, or irregular cross section. The number, shape and/or size of the voids may be selected as a function of the size, shape and/or material of the core.

The voids may be provided by elongate channels running in a substantially axial direction in the elongated ferrite core. In a preferred form, each channel is an open slot orientated in the core axial direction. Preferably, each slot is a radial slot, and the plurality of slots may be uniformly angularly spaced.

The elongate channels may have the same or different depths and/or the same or different widths. The depths and/or widths of the elongate channels may be a function of the size, shape and/or material of the core.

In a preferred form, the depth of each slot is approximately half the distance between the axial centreline of the core and an outer surface of the core. In a cylindrical core, the depth of each slot is therefore preferably around half the core radius.

One or more of the voids may be partially or entirely filled with a dielectric material. A suitable dielectric material may be a solid, liquid or gas. In a preferred form, the dielectric material is air. The central region of the core may be made of a first material of high permeability, and the outer regions may be made of a second material of lower permeability. The first and second material may be bonded together using any suitable means.

The conductor winding is preferably wire, which may be made from any suitable material. Preferably, the wire is copper wire, and preferably enamelled copper wire. The conductor winding is preferably wound in a regular winding pattern on the core.

According to another aspect of the invention, there is provided a transmitter including a transmitter circuit for generating and transmitting an electromagnetic field, the transmitter circuit including the above defined inductor.

The transmitter may be configured to operate at a carrier frequency of around 125 kHz.

The transmitter may be associated with, and preferably carried by, an item of machinery or equipment.

The transmitter may be configured to generate an electromagnetic field detectable within a generally circular area having a radius of about 30 m.

When an AC signal is applied to the inductor, the axial voids in the inductor core allow a change in the induced electromagnetic field to propagate more efficiently through the core, for example, when compared to a solid core with uniform permeability. In this manner, core losses (e.g. due to hysteresis) for a particular operating frequency are reduced and the strength of the electromagnetic field generated by the inductor is increased.

It will be appreciated by those skilled in the art that the reference to material permeability levels is of significance with regard to material losses because the losses are related to the material permeability—in a non-linear manner—for a given frequency of operation and applied field. In particular the losses are significantly affected by the magnitude of the magnetic flux density variation over an operating cycle, and the magnitude of this flux variation is directly determined by the material permeability.

Moreover, arranging the voids predominantly in an axial direction of the core advantageously aligns the voids with the direction of the induced electromagnetic field such that the efficiency in which the core is polarised and repolarised in AC applications can be maximised to thereby maximise the performance of the transmitter.

According to a further aspect of the invention, there is provided a proximity detection system including the above defined transmitter.

The proximity detection system may further include:
at least one receiver for detecting the electromagnetic field transmitted by the above defined transmitter;
a controller for controlling the operation of the transmitter and/or the at least one receiver; and
an indicator for providing a proximity indication based on the detected electromagnetic field by the at least one receiver.

The receiver or receivers can be of any suitable form or size. In one embodiment, the receiver or receivers are in the form of portable tags carried or worn by personnel. Preferably, each receiver is configured to send status information relating to the detection of an electromagnetic field.

The controller may be operatively configured to define one or more detection zones based on the field strength of the electromagnetic field transmitted by the transmitter. The controller may be configured to provide control signals for generating an alert signal when a receiver is located within one or more of the detection zones.

According to a further aspect of the invention, there is provided a method for making an inductor, the method including a step of winding a conductor around an inductor core having a non-uniform permeability.

Preferably, that the conductor covers a substantial portion of the core.

The method preferably includes a step of insulating the core prior to the step of winding. Insulating the core preferably involves covering the core in one or more layers of insulating material.

The method may further include a step of arranging two ends of the conductor at a predetermined distance apart, for convenient connection to the transmitter circuit.

The method may further include a step of coating the core and conductor assembly in a first layer of varnish.

The method may further include a step of insulating the varnished core and conductor assembly to form an insulated core and conductor assembly. The step of insulating may include covering the core in one or more layers of insulating material. In one embodiment, the step of insulating includes covering the core in two layers of insulating material.

The method may further include a step of coating the insulated core and conductor assembly in a second layer of varnish.

Preferably, the method further includes a step of coupling a pair of wires to the two ends of the wound conductor so as to form terminals of the inductor.

The method may further include a step of applying one or more portions of insulating material over the core and conductor assembly. The one or more portions of insulating material may include one or more silicone tubes. The method may include placing the one or more silicone tubes in a spaced arrangement along the core and conductor assembly. The silicon tubes insulate the core and conductor assembly from a housing in which the inductor is enclosed, and facilitate clamping of the housing to the inductor.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

BRIEF DESCRIPTION OF THE DRAWINGS

By way of exemplification, the invention will now be further explained and illustrated by reference to the accompanying drawings, in which.

DETAILED DESCRIPTION OF THE DRAWINGS

The description below and drawings show a particular non-limiting embodiment of the invention developed and tested by the inventors.

Figure 1A:
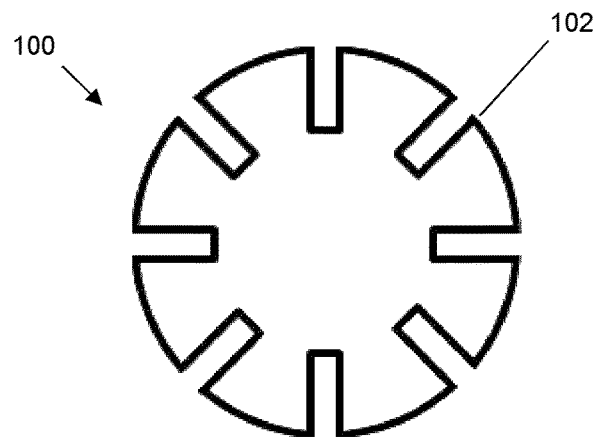
FIG. 1A shows a cross sectional view of a core of an inductor according to the invention.
Figure 1B:
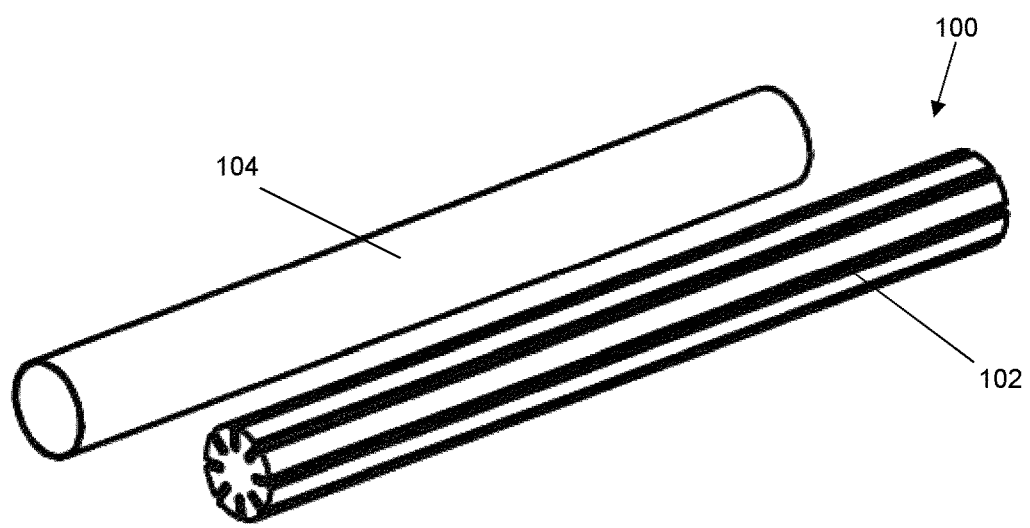
FIG. 1B shows a perspective view of a core of an inductor according to the invention.
Figure 2A:
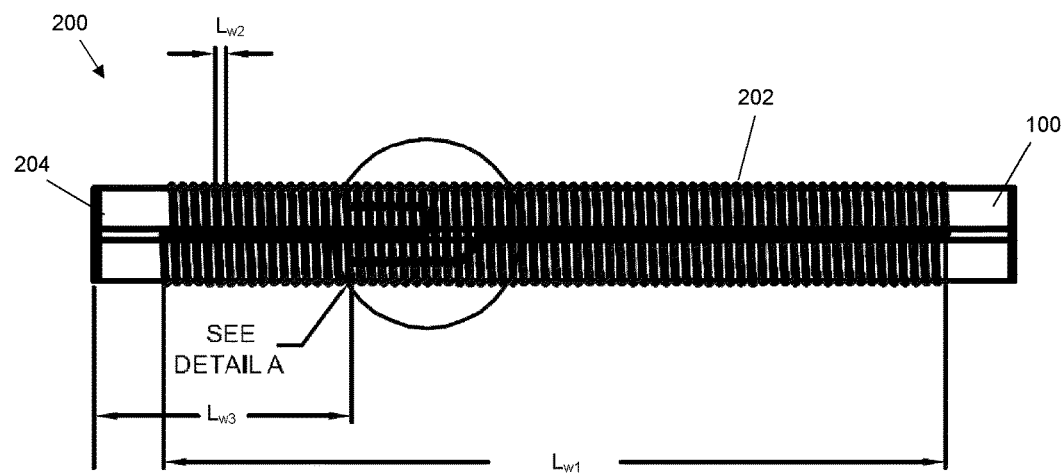
FIG. 2A is a side view of an inductor of the invention including the core of FIG. 1.

FIGS. 1A and 1B illustrates a solid ferrite core 100 of non-uniform permeability of an inductor 200 (see FIG. 2A). The core 100 is generally cylindrical, around 200 mm in length and 20 mm in diameter. Reference 104 denotes an insulation tape cover to the core, discussed further below.

As shown more clearly in FIG. 1A, core 100 defines eight open slots 102 running the entire length of the core 100, each slot 102 orientated in the axial direction of the cylindrical core 100 and extending in a radial direction from the core periphery approximately half way towards the axial centreline of core 100. As shown, the slots 102 are angularly uniformly spaced around the core. Each slot 102 is approximately 1.3 mm wide and 5 mm deep.

The slots 102 have the effect of reducing the permeability of the core 100 in its outer regions, i.e. towards its periphery. In other words, the core permeability is relatively high in its central region (around the axial centreline) and reduces towards the core outer surface. This overall reduction in the effective permeability of the core 100 (compared to a solid uniform core of the same shape and size) allows the core 100 to generate during operation an electromagnetic field with higher dynamic field strength, particularly in low frequency applications.

In operation, an AC signal is applied to the inductor 200. The axial slots 102 in the inductor core 100 allow a change in the induced electromagnetic field to propagate more efficiently through the core 100 than would otherwise be the case. As the slots 102 are arranged in the axial direction, this advantageously aligns them with the direction of the induced electromagnetic field so as to maximise the efficiency in which the core 100 is polarised and repolarised in response to the AC signal. In this manner, core losses (e.g. due to hysteresis) for a particular operating frequency are reduced and the strength of the electromagnetic field generated by the inductor is increased.

It will be appreciated that an important consideration in the core design is the reduction in core loss for a given nominal permeability core and a given effective diameter. The effective diameter determines the core cross-sectional area and hence the coil field strength. The core loss is directly related to the complex permeability and hence to the effective winding resistance at a given drive frequency, hence the permeability of the core is an important consideration in maximising transmitter performance.

The introduction of axial channels of any geometry permits a change in the applied core field to propagate faster throughout the core material, and hence for a given applied AC frequency, the hysteresis and thus the losses will be reduced.

In order to maintain an effective magnetic core cross section, any relief of material in the outer regions of the core should be in a predominantly axial direction, as this is the direction of the induced magnetic field. As an alternative to the slotted core described and illustrated, the core relief could also be provided by closed channels (axial tubular voids) under the surface of the core, particularly in the peripheral regions. The objective is to allow the applied field to act on all magnetic domains within the cross section in a substantially even manner, such that the entire core can be repolarised as quickly as possible for a given applied field change. The skilled reader will appreciate that there is a limit to how much core relief can be introduced (ie. how much the core cross section can be reduced) before there will be an overall adverse effect on field strength.

Further, some hollowing of the centre of the core may also be beneficial. For example, a cylindrical bore along the core centreline, with a diameter of around 2 mm (and preferably no more than 25% of the core diameter), may assist an induced electromagnetic field to propagate faster through the core when an alternating magnetising field is applied. Hollowing of a central part of the core also provides the advantage of a saving in material.

Figure 2B:
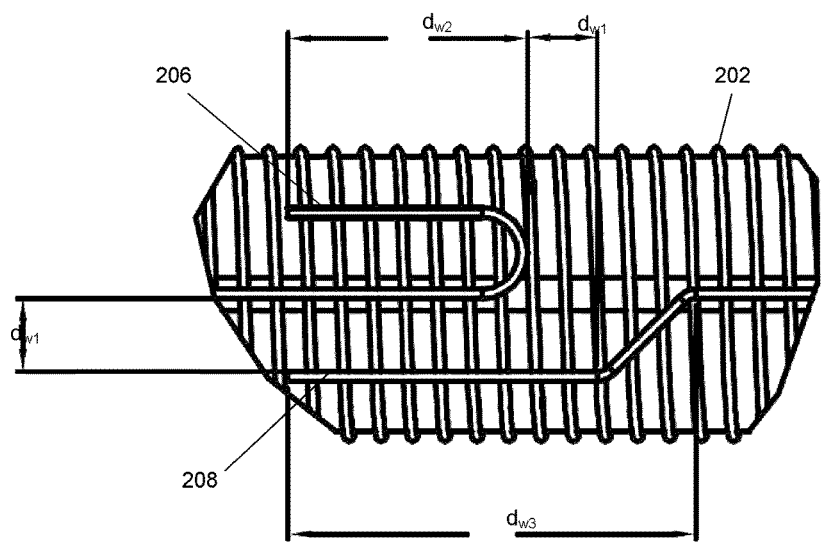
FIG. 2B is a detailed view of a portion of the inductor of FIG. 2A.

The inductor 200 shown in FIGS. 2A and 2B includes the non-uniform cylindrical core 100 of FIG. 1, and enamelled copper wire 202 providing a single layer of uniform conductor windings. As shown in FIG. 2A, the copper wire 202 is wound around a substantial portion of the core 100.

The wire 202 has a diameter of around 0.7 mm. Typically, the length of the core 100 covered by the wire 202 ($L_{w1}$) is around 170 mm, i.e. the winding is applied to around 85% of the length of the core.

In the embodiment, there are 72 turns of winding around the core 100. Typically, the winding turn separation ($L_{w2}$) is around 2 mm to 3 mm.

Straight, parallel end portions 206, 208 (see FIG. 2B) of the wire 202 are arranged at around 56 mm (distance $L_{w3}$) from one end 204 of the core 100. These provide the electrical terminals of the winding.

FIG. 2B more clearly illustrates the arrangement of the two end portions 206, 208 of the wire 202. The end portions 206, 208 are orientated in the core axial direction and begin at points separated in the axial direction by around 5 mm (distance $d_{w1}$). This provides for convenient connection of the transmitter driving circuit, with sufficient separation between the connection points when the winding is broken out, having regard to the high potential difference across the coil at resonance.

As shown in FIG. 2B, wire 202 is bent at each end to form end portion 206, 208 as required. The lengths of the respective end portions are approximately 18 mm (end portion 206, length $d_{w2}$) and approximately 30 mm (end portion 208, length $d_{w3}$).

Figure 3A:
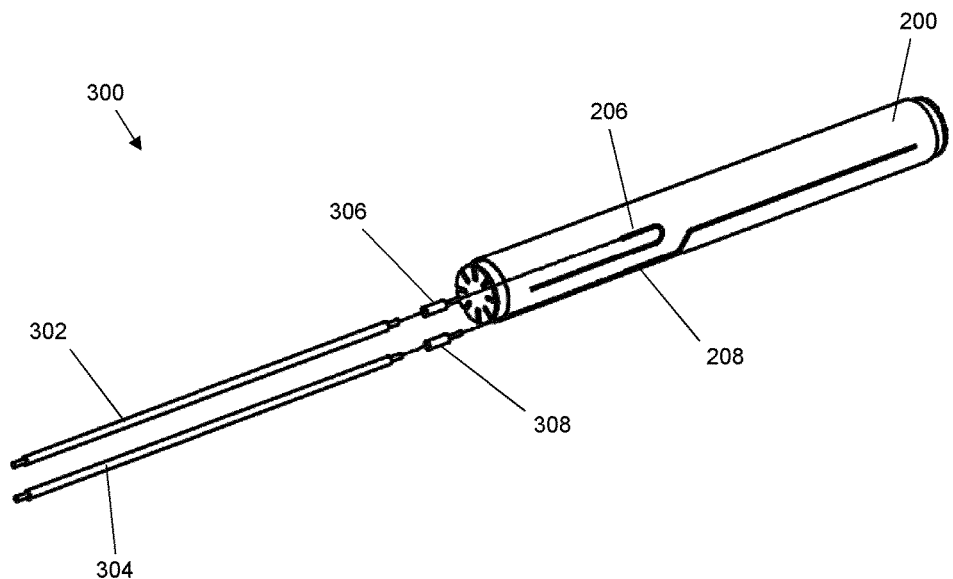
FIGS. 3A, 3B and 4 show an antenna assembly for a transmitter according to the invention.
Figure 3B:
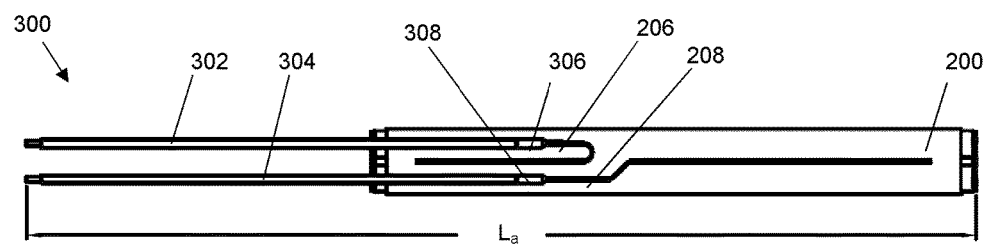

The antenna assembly 300 as shown FIGS. 3A and 3B includes inductor 200 as described above, and two like straight wire terminal sections 302, 304, each approximately 170 mm in length, made from silicone insulated tinned cooper wire. The terminal sections 302, 304 are soldered to respective end portions 206, 208 of the wire 202, and heat shrink 306, 308 is applied to the respective joints. The length ($L_a$) of the overall antenna assembly 300 is approximately 315 mm.

Figure 4:
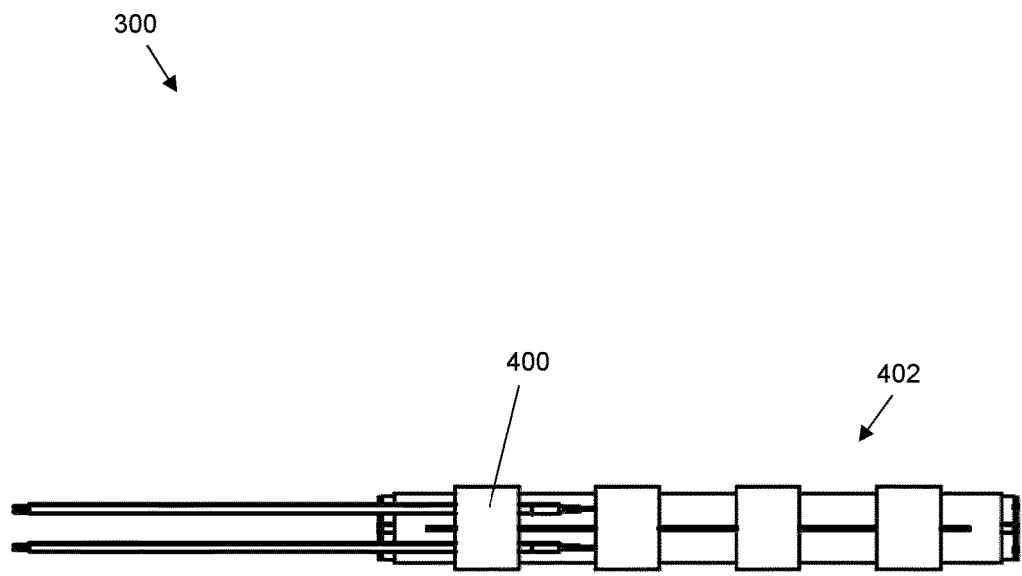

FIG. 4 illustrates the antenna assembly 300 in its final form, including further insulating layers (see below) surrounded by four insulating silicon rings 400, approximately uniformly axially spaced along the core as shown.

The antenna assembly 300 further includes a housing (not shown) for enclosing the body 402 of the antenna assembly 300. The silicon rings 400 serve to separate body 402 from the housing, providing a resilient suspension for it within the housing. More particularly, the housing is tubular, comprising two longitudinal halves which are brought together to enclose the antenna assembly. The inner surface of the housing includes shaped recesses to engage with the silicon rings 400.

A method of making the antenna assembly 300 will now be described with reference to the Figures.

At step 1, two layers of insulating tape 104 are wrapped around core 100 to cover it, so to provide a first stage assembly (see FIG. 1B).

At step 2, the enamelled copper wire 202 is wound in a single layer onto the first assembly over the insulating tape 104 (see FIG. 2A). Then, the end portions 206, 208 of the wire 202 are arranged as shown in FIG. 2B to provide a second stage assembly. The windings 202 are thus closely wound on and carried by ferrite core, separated from it only by the insulating tape 104.

At step 3, the second assembly is coated in a layer of varnish, leaving wire end portions 206, 208 exposed, to provide a third stage assembly.

At step 4, the third assembly is wrapped in a further two layers of insulating tape (not shown), again leaving wire end portions 206, 208 exposed, to provide a fourth stage assembly.

At step 5, the fourth assembly is coated in a further coat of varnish, once again leaving wire end portions 206, 208 exposed, to provide a fifth stage assembly, shown in FIG. 3A.

At step 6, the wire end portions 206, 208 are stripped of enamel and coupled respectively to the two wire terminal sections 302, 304 by soldering, with a solder joint overlap of around 8 to 12 mm. Heat shrink tubes 306, 308 are then applied to protect the joints, so producing a sixth stage assembly.

At step 7, four silicone rings 400 are applied over the sixth assembly to provide the final antenna assembly of FIG. 4 ready for encapsulation in the antenna housing.

In the embodiment tested, the inductance of inductor 200 was around 550 to 650 μH when an AC voltage of approximately 24V having a frequency of around 125 kHz was applied at about 25° C.

During testing, the response characteristics of the inductor 200 demonstrated that the non-uniform core 100 had surprisingly low core losses, allowing the inductor 200 to generate stronger electromagnetic fields for a particular operating frequency and core effective permeability than would otherwise have been achievable.

Moreover, when compared with a solid uniform core having the same permeability, the non-uniform core 100 provides for a greater core diameter such that the effective diameter of the windings and the overall surface area of the inductor 200 can be increased, thereby further reducing core and winding losses.

Figure 5:
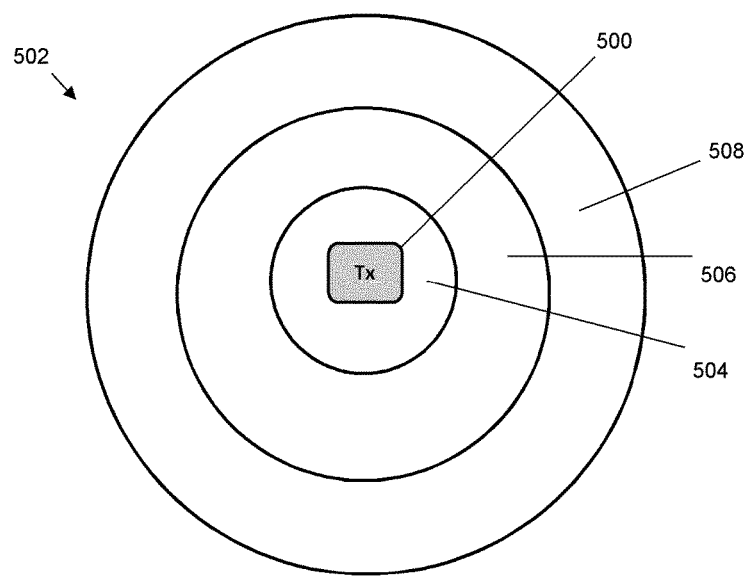
FIG. 5 is a schematic diagram illustrating detection zones of a transmitter according to the invention.

Turning to FIG. 5, a transmitter 500 incorporates the inductor assembly 200 described above, and includes a transmitter circuit configured to apply an AC signal to the antenna assembly 300 to thereby generate an electromagnetic field 502. In the embodiment tested, an electromagnetic field covering a generally elliptical detection area having a radius of approximately 30 m is generated. The detection area is defined as an area surrounding the transmitter 500 covered by the electromagnetic field when seen in plan view.

The detection area can be nominally divided into different detection zones, such as three concentric zones 504, 506, 508. The area covered by each detection zone 504, 506, 508 can be defined using a controller 604 coupled to the transmitter 500 (see FIG. 6).

Figure 6:
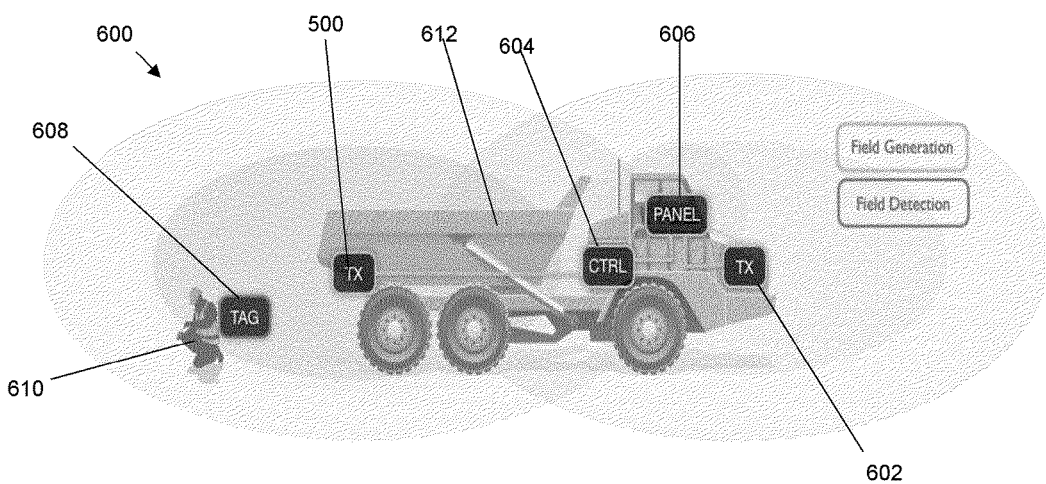
FIG. 6 is a schematic diagram of a proximity detection system according to the invention.

The proximity detection system 600 of FIG. 6 includes transmitter 500 as described above and a further transmitter 602, applied to spaced apart points on a vehicle 612. The number and coverage of the various detection zones defined for transmitter 602 can be different to those defined for transmitter 500.

The controller 604 can be used to select the definition of a suitably sized area as a detection zone for each transmitter based on various factors to be considered, such as the location of mounting of the transmitter and the specific application of the system 600. For example, some workplaces, such as mining sites or harsh environments in which an operator's hearing and/or vision may be compromised, may require larger detection zones and/or larger numbers of detection zones to be defined. Other workplaces, such as storage warehouses, may require relatively smaller detection zones and/or small numbers of detection zones to be defined.

As well as controller 604, the proximity detection system 600 further includes a display panel 606 and a plurality of receivers 608, each receiver 608 being a portable tag carried by an individual 610 and configured to detect the strength of the electromagnetic field generated by transmitters such as transmitters 500, 602.

Transmitter 500, controller 604, transmitter 602 and display panel 606 are connected together through wired connections as shown, although alternatively they may be interconnected through wireless connections. Receiver 608 communicates with controller 604 wirelessly, by way of suitable radio signals.

The controller 604, transmitters 500, 602 and display panel 606 are mounted to vehicle 612, and can be powered by the vehicle's power supply. The receiver 608 can include one or more indicators (not shown) such as LEDs, buzzers, displays or any combination thereof for generating a suitable alert signal to the individual 610 when it is determined that the receiver 608 is within a prescribed detection zone of transmitter 500 or 602. Similarly, the display panel 606 includes suitable indicators to alert an operator controlling the vehicle 612 when an individual 610 is detected in a detection zone of transmitter 500 or 602.

The indicators can include one or more lights, alarms, images, videos, and the like, or any combination thereof. The individual 610 can therefore take immediate action to avoid a collision by moving away from the vehicle 612, and/or the operator of the vehicle 612 can take suitable action such as slowing, stopping or altering direction of vehicle 612.

Optionally, each detection zone can be associated with a different alert signal. In an event that receiver 608 is moved into more than one detection zone (e.g. when the receiver 608 detects magnetic fields from field transmitters from two different sources), information can be transmitted that signals this status.

The transmitters 500, 602, controllers 604 and display panels 606 can be mounted to a wide variety of machinery or other equipment, and/or to fixed structures at a work site.

In the proximity detection system 600, a plurality of receivers 608 and transmitters 500 can be used to fully accommodate all operators, personnel, machinery and infrastructure of a work site.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

The claims defining the invention are as follows:

1. An inductor for a transmitter for generating and transmitting an electromagnetic field, the inductor including:
    an integrally formed elongate core with a centreline, the core having a first region around said centreline, and an outer region surrounding said first region, said core having non-uniform permeability, with high permeability in said first region and lower permeability in said surrounding outer region; and a conductor winding arranged around and external of said first and said outer regions of the core, wherein the outer region of the core includes a plurality of voids inside the periphery of the core in the form of elongate channels in the core so that the outer region includes portions of the core spaced apart from one another by the elongate channels, wherein the first region is a region of solid and uniform material of the core that includes the centerline of the core, and wherein the lower permeability in said surrounding outer region is attributable to the plurality of voids.

2. The inductor according to claim 1, wherein the conductor winding is closely wound around and carried by the core.

3. The inductor according to claim 1, wherein the core is substantially cylindrical.

4. The inductor according to claim 1, wherein the elongate channels in the core run in a substantially axial direction of the core.

5. The inductor of claim 4, wherein each void is an open slot orientated in the axial direction of the core.

6. The inductor according to claim 5, wherein a depth of each elongate channel is approximately half the distance between the centreline of the core and an outer surface of the core.

7. The inductor according to claim 1, having an operating frequency in the range of about 30 kHz to 300 kHz.

8. The inductor according to claim 1, having an operating frequency of around 125 kHz.

9. A transmitter including a transmitter circuit for generating and transmitting an electromagnetic field, the transmitter circuit including the inductor according to claim 1.

10. A proximity detection system including the transmitter of claim 9.

11. The proximity detection system of claim 10, further including:

at least one receiver for detecting the electromagnetic field transmitted by the transmitter;

a controller for controlling the operation of the transmitter and/or the at least one receiver; and an indicator for providing a proximity indication based on the detected electromagnetic field by the at least one receiver.

12. The proximity detection system of claim 11, wherein the at least one receiver is in the form of a portable tag carried or worn by an individual at a worksite.

13. The proximity detection system according to claim 11, wherein the at least one receiver is configured to provide status information relating to the detection of said electromagnetic field.

14. The proximity detection system according to claim 11, wherein the controller is operatively configured to define one or more detection zones based on field strength of said electromagnetic field.

15. The proximity detection system of claim 14, wherein the controller is configured to provide control signals for generating an alert signal when at least one receiver is located within one or more of the detection zones.

16. The inductor according to claim 1, wherein the core is formed from a metallic element.

17. A method for making an inductor for a transmitter for generating and transmitting an electromagnetic field, including:

winding a conductor around and external of an inductor core to form a core and conductor assembly, the inductor core being an integrally formed elongate core with a centreline, the core having a first region around said centreline, and an outer region surrounding said first region, said core having non-uniform permeability, with high permeability in said first region and lower permeability in said surrounding outer region as said outer region includes a plurality of voids inside the periphery of the core in the form of elongate channels in the core so that the outer region includes portions of the core spaced apart from one another by the elongate channels, wherein the first region is a region of solid and uniform material of the core that includes the centerline of the core, and wherein the lower permeability in said surrounding outer region is attributable to the elongate channels.

18. The method of claim 17, including:

insulating the core prior to winding;

arranging two ends of the conductor at a certain separation;

coating said core and conductor assembly in a first layer of varnish; insulating the varnished core and conductor assembly; and coupling two wires respectively to the two ends of the wound conductor so to form extended inductor terminals.

19. An inductor for a transmitter for generating and transmitting an electromagnetic field, the inductor including:

an elongate core with a centreline, the core having a first region around said centreline, and an outer region surrounding said first region, said core having non-uniform permeability, with high permeability in said first region and lower permeability in said surrounding outer region; and a conductor winding arranged around and external of said first and said outer regions of the core, wherein the outer region of the core includes a plurality of voids inside the periphery of the core, wherein the core is integrally formed, wherein the first region is a region of solid and uniform material of the core that includes the centerline of the core, and wherein the lower permeability in said surrounding outer region is attributable to the plurality of voids.

* * * * *